United States Patent
Smith et al.

(10) Patent No.: US 9,447,909 B2
(45) Date of Patent: Sep. 20, 2016

(54) CONNECTOR ASSEMBLY USABLE AS A CLOSURE AND TO ESTABLISH A FLUID CONNECTION

(71) Applicant: Chromatic Industries, Inc., Conroe, TX (US)

(72) Inventors: Blake Everett Smith, College Station, TX (US); Harold Wayne Hall, Tomball, TX (US)

(*) Notice: Subject to any disclaimer, the term of this patent is extended or adjusted under 35 U.S.C. 154(b) by 62 days.

(21) Appl. No.: 13/962,425

(22) Filed: Aug. 8, 2013

(65) Prior Publication Data

US 2015/0041472 A1 Feb. 12, 2015

(51) Int. Cl.
| | |
|---|---|
| *F16L 55/10* | (2006.01) |
| *F16L 55/11* | (2006.01) |
| *F16L 15/04* | (2006.01) |
| *F16L 17/025* | (2006.01) |
| *F16L 17/035* | (2006.01) |

(52) U.S. Cl.
CPC ............ *F16L 55/1108* (2013.01); *F16L 15/04* (2013.01); *F16L 17/025* (2013.01); *F16L 17/035* (2013.01)

(58) Field of Classification Search
CPC ............... F17C 2223/035; F17C 2223/036; Y10S 285/917; F16K 5/0407; F16K 5/0478; F16K 5/184; Y10T 137/0519; F16L 55/1283; F16L 55/132
USPC .............. 220/233–241; 138/89, 94; 277/641, 277/910; 285/212, 219, 220, 378, 379
See application file for complete search history.

(56) References Cited

U.S. PATENT DOCUMENTS

| | | | |
|---|---|---|---|
| 1,595,186 A | | 8/1926 | Gray |
| 2,016,226 A | | 10/1935 | Clausen |
| 2,435,913 A | | 2/1948 | Wall |
| 2,624,488 A | | 1/1953 | Pritchard |
| 3,042,248 A | * | 7/1962 | Krueger .................. 220/240 |

(Continued)

OTHER PUBLICATIONS

Authorized Officer Blaine R. Copenheaver, PCT International Search Report and Written Opinion, Dec. 15, 2014, WIPO ISA/US, Alexandria, VA, United States.

(Continued)

*Primary Examiner* — Shawn M Braden

(57) ABSTRACT

Connector assembly and methods usable to block fluid flow therethrough. The connector comprises a female hub having an axial bore, internal threads, and an internal shoulder. The hub is adapted to connect to a fluid container, valve, or conduit and to receive a male connector adapted to block fluid flow through the connector assembly. The male connector comprises external threads and a face comprising a front seal adapted to engage the shoulder. The face comprises a ring-shaped surface adapted to contact the shoulder and form a fluid seal. The face comprises an outer seal that is positioned outwards from the ring-shaped surface and adapted to engage a circumferential surface of the hub. Embodiments of the current invention relate to fluid connectors and methods usable to form a sealed fluid connection between a female connector and a male connector, wherein the male connector comprises an axial bore extending therethrough.

10 Claims, 6 Drawing Sheets

(56) References Cited

U.S. PATENT DOCUMENTS

| | | | |
|---|---|---|---|
| 3,430,801 A * | 3/1969 | Homrig | 220/237 |
| 4,109,820 A | 8/1978 | Stifano | |
| 4,140,240 A | 2/1979 | Platts | |
| 4,239,242 A | 12/1980 | Burns | |
| 4,384,655 A | 5/1983 | Kendall | |
| 4,618,154 A * | 10/1986 | Freudenthal | 277/556 |
| 4,709,831 A | 12/1987 | Coplan | |
| 5,029,812 A * | 7/1991 | Haynes | 251/327 |
| 5,291,842 A * | 3/1994 | Sallstrom et al. | 111/127 |
| 5,489,041 A | 2/1996 | Matthews et al. | |
| 5,850,934 A | 12/1998 | Kumar | |
| 6,116,285 A | 9/2000 | Wilson | |
| 6,663,149 B1 | 12/2003 | White | |
| 7,036,674 B2 | 5/2006 | McGuire | |
| 7,243,685 B2 | 7/2007 | White et al. | |
| 7,810,668 B2 | 10/2010 | Van De Klippe et al. | |
| 8,001,995 B2 | 8/2011 | Molloy | |
| 8,353,420 B1 | 1/2013 | Carlson | |
| 2003/0081993 A1 | 5/2003 | Smith | |
| 2004/0084902 A1 * | 5/2004 | Smith, III | 285/379 |

OTHER PUBLICATIONS

Applicant's Attorney Erik Osterrieder, Article 19 Amendments and Statement Combined with Comments on the Written Opinion, Feb. 16, 2015, Houston, Texas, United States.

* cited by examiner

CONNECTOR ASSEMBLY USABLE AS A CLOSURE AND TO ESTABLISH A FLUID CONNECTION

FIELD

Embodiments usable within the scope of the present disclosure relate, generally, to closures for pipes, pressure vessels, and other fluid containers. More particularly, but not by way of limitation, the present disclosure relates to threaded closure assemblies usable to open and close pipes, pressure vessels, and other fluid containers to selectively gain assess therein and to fluid seal configurations usable with said closures. Embodiments usable within the scope of the present disclosure also relate, generally, to connectors for pipes, pressure vessels, and other fluid containers. More particularly, the present disclosure relates to threaded fluid connectors usable to rigidly connect ends of pipes, pressure vessels, and other fluid containers and to fluid seal configurations usable with said threaded fluid connectors.

BACKGROUND

A closure selectively closes an access port on a pressure-containing vessel, providing access to its interior. Various designs of quick acting closures are utilized on pressure vessels, including pipelines, within the chemical, oil and gas, food, and nuclear industries. The demand to frequently obtain access to pressure vessels has been increasing, thereby enhancing the need for a safe closure that provides quick opening and closing/sealing capabilities.

Closure designs commonly fall into one of three groups: threaded style, clamp style, or flat door. Each style has three basic parts: a hub section (e.g. a female connector or housing) permanently and sealingly secured to the vessel or pipeline, a plug (e.g. a male connector or a plug) which provides a seal against the hub, and a plug hinge or plug transport mechanism.

The flat door version offers the quickest access of the three types. Yet, its weight makes installation difficult, and corrosion over long periods can inhibit operation. Elaborate sealing techniques are also required. The flat door is usually secured to the hub with a self-hinging or lifting arrangement.

The clamp style closure functions by bringing two flanges together and then securing their position with an external annular locking ring arrangement. Commonly, the annular lock ring is presented in two segments, which may be held together via a bolting arrangement. While the concept is simple, the closure assembly is heavy, and difficult to operate and seal. Not only does the door require some handling/articulation to the permanent portion of the closure, but also the locking ring itself poses handling difficulties. Some type of powered drive is commonly required to secure such a device. One major inhibition is that the presence of pressure is not obvious to the operator. Cases of catastrophic failure and doors being opened under operating pressure have resulted in death and injury.

The flat door and the clamp style flanges are complex, difficult to manufacture and operate, and/or require removal of material from critical pressure retaining surfaces that prevent compliance with international design codes. Some of these prior art designs do not or cannot incorporate an integral safety locking feature that prevents unsafe handling and operation of the closure.

A frequent application for a closure is on pipelines to launch and retrieve a "pig," which is a device used in cleaning and inspecting the pipelines. Historically, most operations have used a working pressure below 5000 psi. Recently, sectors of the petroleum industry, including pig-launching pipelines, are requiring the use of higher-pressure closures.

Performing maintenance on closure assemblies is difficult and expensive. A need therefore exists for a closure assembly having a simple and reliable design that is not susceptible to contamination, is easy to maintain, and provides the ability to reliably and securely close a pipe, a pressure vessel, or other container.

Furthermore, there is a need for a closure assembly that can quickly and easily provide access to the interior of a pipe, a pressure vessel, or other container.

Although a number of different closures are in use, few of them, if any, are designed for operation at high-pressure levels more frequently demanded by the petroleum industry. Therefore, a need also exists for a closure assembly that can repeatedly, reliably, and safely seal a pipe, a pressure vessel, or other container comprising fluids at high pressures.

Other embodiments of male and female fluid connectors can be used to transfer fluid between two vessels, containers, pipes, or fluid conduits. Specifically, in constructing a pipe assembly, the ends of two pieces of pipe are joined axially to form a single conduit that is used to transport materials from one point to another. Often times, the materials being transported are fluid or gaseous in nature, and, particularly in those circumstances, it is desired that the pipeline be impervious to leaks. In order to accomplish that goal, those skilled in the business of pipe and pipeline construction are constantly in search of improved means for securing the joints formed by connecting the ends of pipe together.

There are numerous methods currently in use by those in the pipe and pipeline construction industry to obtain a secure joint. These methods employ different types of components and can be distinguished by the various ways in which such components are employed. The selection of these different methods will usually depend on the overall design requirements of the pipeline. For example, one important design requirement exists when it is desired that the pipe joints be sealed such that the material being transported within the pipeline cannot escape and, conversely, foreign materials are prevented from entering the pipeline.

Another important design requirement exists when it becomes necessary to join the pipe components in a rigid or restrained manner. This is usually desired in order to prevent the pipe components from separating due to thrust forces that often occur when the piping system is subjected to internal pressure or when earth tremors or other external forces contact the pipes. Still another objective is to make assembly of the pipe joints as simple, economical and reliable as possible.

One current method for connecting pipe together employs the use of flanged fittings and gaskets. These are typical components in rigid piping systems, particularly aboveground systems, such as water filtration plants, sewage disposal plants, wastewater treatment plants, pumping stations, chemical plants, and refineries. Often times, the flanged fitting is threaded directly onto the pipe. This is accomplished by threading an end of a pipe and threading a compatibly sized flanged fitting. The threaded flanged fitting is then machine-tightened onto the end of the pipe and transported to the field in this joined condition. The threaded flanged pipe is then connected to another flanged pipe, usually by bolting means. In order to obtain a leak-free joint, a gasket may be used between the faces of the two-flanged fittings.

The use of threaded flanged fittings presents several limitations. Specifically, the threaded flanged fitting is custom machined to accommodate the exact diameter of the pipe and to provide a smooth surface across the end of the pipe and the face of the flanged fitting. In addition, extremely high torques is required to tighten properly the flanged fitting onto the threaded pipe. Consequently, one major limitation of this system is that preparation of the flanged fitting and pipe requires sophisticated machinery not usually available on-site where the finished component will be assembled and installed.

A further problem with flanged fittings is that the time taken to tighten a large number of flange bolts to the torque, necessary to achieve a good seal between the pipe, gasket and seal, can be considerable. It would therefore be advantageous if the use of flange bolts could be eliminated and the torque needed to achieve an efficient seal reduced without any loss of seal integrity.

Another common method for connecting the ends of pipe involves inserting the spigot end of one pipe into the expanded end of a second pipe, the interior profile of which has been specially fabricated to form a socket (the expanded end sometimes being referred to as the "bell end"). The bell end is sized to accommodate the spigot end of the pipe to be received. The connection obtained by this method is also known in the industry as a "push-on joint." There are several methods used to seal and/or secure the push-on joint. One such method involves inserting a fitted gasket within an annular recess formed within the throat of the socket of the bell. After the gasket is inserted into the annular recess of the socket, the spigot is aligned and forced through the gasket into the bottom of the socket, thereby compressing the gasket and sealing the two pipe ends together.

Still another common method for connecting pipe is sometimes referred to as a "mechanical joint." In embodiments of this method, the bell end of a pipe has a flanged portion cast on it. The spigot end of a second pipe is fitted with a slidable gland fitting and a gasket, which is conically shaped such that one face of the gasket is diametrically larger than the second face of the gasket. The conically shaped gasket is positioned between the gland fitting and the spigot end of the pipe with the smaller, second face of the gasket being closer to the spigot end than the larger, first face of the gasket. The gland fitting has a plurality of apertures for receiving standard bolts. The gland fitting also has an integrally formed, protruding lip, which encircles the face of the gland fitting at its inside diameter, such that the lip is adjacent to the surface of the pipe and faces the spigot end of the pipe when the gland fitting is positioned on the pipe. The face of the flanged portion has a tapered notch designed to receive the conically shaped gasket when the spigot end is inserted into the bell. The joint is formed when the spigot is axially inserted into the bell, and the gland fitting and the flanged portion are bolted together, causing the lip of the gland fitting to compress the gasket thus sealing the two pipe pieces.

Push-on joints and mechanical joints, have an increased tendency to loosen after a lengthy period of use, especially when repeatedly placed under large bending forces. Thus, a need also exists for a fluid connector assembly that can withstand strong bending forces caused by riser movement for extended periods. A new fluid connector assembly is needed that can be used with standard pipe or pressure vessels, can be assembled easily in the field, and can be equally or more stable and secure than other alternatives now available.

The disadvantages of the prior art are overcome by the present invention, which meets all of these needs. An improved closure assembly and a method of closing a hub attached to a pipe, a pressure vessel, or other container are hereinafter disclosed.

SUMMARY

Embodiments usable within the scope of the present disclosure include a connector assembly having a housing (e.g., a hub) with a bore extending therethrough and a plug adapted for engagement with the housing.

A first end of the housing can be adapted for connection to a container (e.g., a pressure vessel, a fluid vessel, a fluid conduit, a pipe, a fluid valve), and a second end thereof can have internal threads for engagement with the plug. The housing can further include an internal shoulder extending laterally, relative to the longitudinal axis. The plug can include external threads and a face section adapted for insertion into the housing to form a fluid seal therewith. In an embodiment, the face can include a first seal (e.g., a cup seal or similar type of seal) adapted to engage the shoulder of the housing to form a fluid seal, and a front sealing surface, which can extend around the first seal, for contacting the internal shoulder to form a metal-to-metal fluid seal. In a further embodiment, the housing can include a first internal sealing surface between the shoulder and the internal threads, and a second seal extending around the face section (e.g., defining the outer edge thereof), which can engage the internal sealing surface of the housing. The first internal sealing surface of the housing can extend diagonally with respect to the longitudinal axis of the housing. Additionally, in an embodiment, the housing can include a second internal sealing surface above the internal threads, which can be engaged by a third seal extending around the plug above the external threads to form a seal.

Embodiments usable within the scope of the present disclosure include a fluid connector assembly having a female connector, with a bore extending therethrough, and a male connector, with a bore extending therethrough, adapted for engagement with the housing.

In an embodiment, the female connector can include internal threads defining a portion of the bore. The female connector can further include an internal sealing ledge. The male connector, having a front end and a back end opposite the front end, can include external threads and a ring-shaped protrusion, extending at the front end, adapted to contact and seal against the sealing ledge. In an embodiment of the fluid connector, the male connector can include a first seal at the front end of the male connector. The first seal can be adapted to engage the sealing ledge to form a fluid seal and can be positioned radially inward from the ring-shaped protrusion. In an embodiment, the first seal can be a U-cup seal that can be expanded by internal fluids located within the bore of the female connector. In a further embodiment of the connector assembly, the female connector can include a first circumferential sealing surface adjacent to the internal threads that can engage a second seal, which can define an outermost portion of the front end of the male connector. The second seal can include an outer diameter that is smaller than a minor diameter of the internal threads of the female connector. In an embodiment of the connector assembly, the female connector can include a second circumferential sealing surface adjacent to the internal threads. The male connector can include a third seal adapted to engage the second circumferential sealing surface to form a seal.

Embodiments usable within the scope of the present disclosure include methods for making a sealed connection between a female fluid connector and a male fluid connector.

The method can include the steps of threadably engaging the male fluid connector with the female fluid connector, moving a first sealing member located on a front face of the male connector into contact with an internal lateral shoulder of the female connector, thereby forming a first fluid seal. The method can include the step of forming a fluid passageway between the front face of the male connector and the internal shoulder of the female connector for communicating fluid from an axial bore of the female connector into a space between lips of the first sealing member. The method can include the stem of moving a ring-shaped surface located on the front face of the male fluid connector extending around the first seal into contact with the internal lateral shoulder of the female connector, thereby forming a second fluid seal around the first fluid seal. An embodiment of the method can also include the step of moving a second sealing member located on a first external circumferential surface of the male connector into contact with a first internal circumferential surface of the female connector, thereby forming a third fluid seal. In an embodiment, the method can also include the step of increasingly compressing the second sealing member between the first external circumferential surface of the male connector and the first internal circumferential surface of the female connector.

The foregoing is intended to give a general idea of the invention, and is not intended to fully define nor limit the invention. The invention will be more fully understood and better appreciated by reference to the following description and drawings.

BRIEF DESCRIPTION OF THE DRAWINGS

In the detailed description of various embodiments usable within the scope of the present disclosure, presented below, reference is made to the accompanying drawings, in which.

DETAILED DESCRIPTION OF THE EMBODIMENTS

Before describing selected embodiments of the present invention in detail, it is to be understood that the present invention is not limited to the particular embodiments described herein. The disclosure and description of the invention is illustrative and explanatory of one or more presently preferred embodiments of the invention and variations thereof, and it will be appreciated by those skilled in the art that various changes in the design, organization, order of operation, means of operation, equipment structures and location, methodology, and use of mechanical equivalents, as well as in the details of the illustrated construction or combinations of features of the various elements, may be made without departing from the spirit of the invention.

As well, the drawings are intended to describe the concepts of the invention so that the presently preferred embodiments of the invention will be plainly disclosed to one of skill in the art, but are not intended to be manufacturing level drawings or renditions of final products and may include simplified conceptual views as desired for easier and quicker understanding or explanation of the invention. As well, the relative size and arrangement of the components may differ from that shown and still operate within the spirit of the invention as described throughout the present application.

Moreover, it will be understood that various directions such as "upper", "lower", "bottom", "top", "left", "right", and so forth are made only with respect to explanation in conjunction with the drawings, and that the components may be oriented differently, for instance, during transportation and manufacturing as well as operation. Because many varying and different embodiments may be made within the scope of the inventive concept(s) herein taught, and because many modifications may be made in the embodiments described herein, it is to be understood that the details herein are to be interpreted as illustrative and non-limiting.

Figure 1:
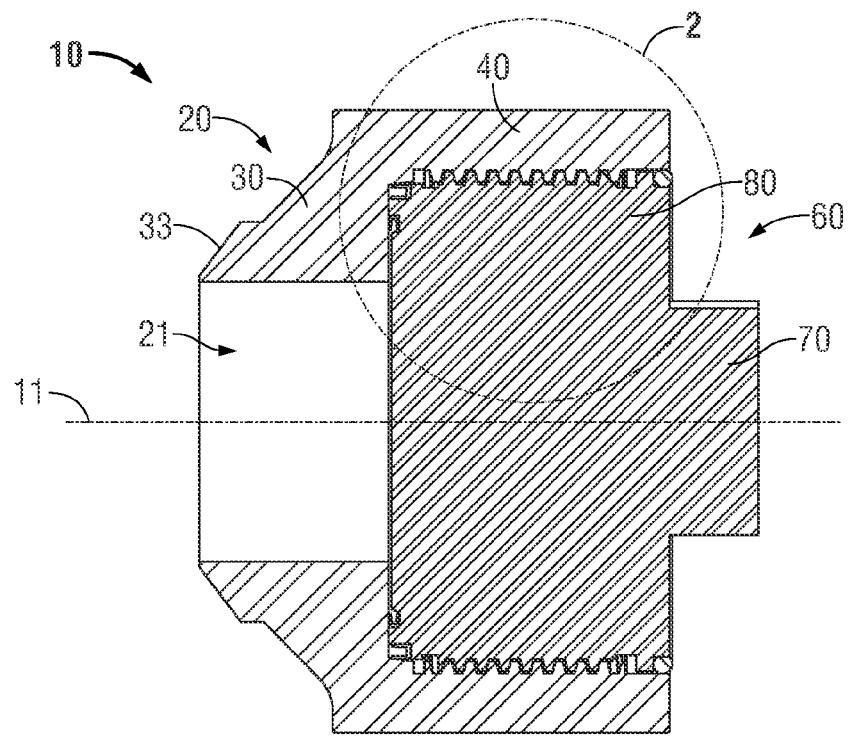
FIG. 1 depicts a cross sectional side view of an embodiment of a device usable within the scope of the present disclosure, which includes an embodiment of the closure assembly in an engaged position.

Referring now to FIG. 1, showing a side cross-sectional view of an embodiment of a fluid connector assembly, which is depicted as a closure assembly (10), comprising a housing (e.g., a female connector), which is depicted as a hub (20), and a plug (60) (e.g., a male connector), in an engaged position. The depicted hub (20) is shown having a generally cylindrical configuration and a bore (21) extending therethrough, along its central axis (11). The depicted hub (20) further comprises a connection section (30), which is adapted for connection to a pressure vessel, a pipe, or any other fluid container. The hub (20) may also be integrally formed or adapted for connection with a fluid valve (not shown), such as a blow down valve, a ball valve, a gate valve, a butterfly valve, a flow control valve, or any other valve known in the industry. The hub (20), as shown, includes a main body (40), which is adapted to threadably engage and form a fluid seal with a plug (60). The plug (60) is shown comprising a head (70) and a main body (80) sections. The depicted main body (80) of the plug (60)

comprises a generally cylindrical configuration and is adapted to threadably engage the hub (20). Projecting from the main body (80) is a hexagonal head (70), enabling an operator to maneuver and rotate the plug (60) in order to engage it with the hub (20).

Figure 3:
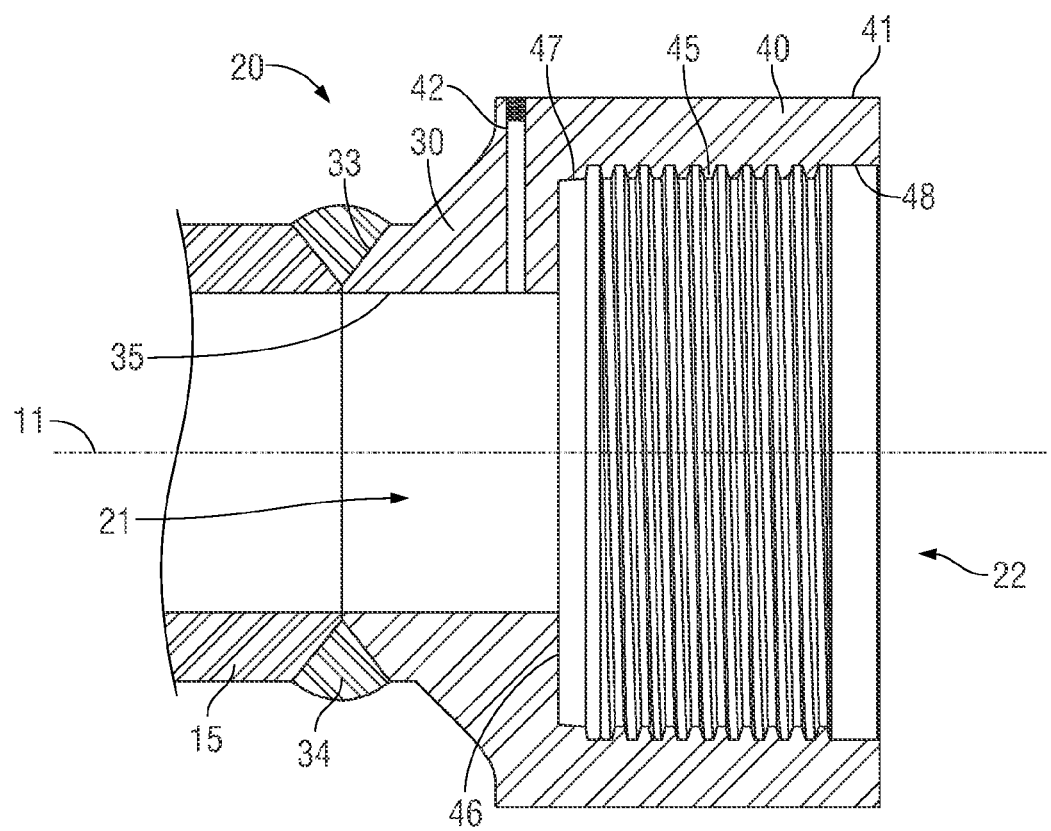
FIG. 3 depicts a cross sectional side view of an embodiment of the device usable within the scope of the present disclosure, which includes an embodiment of the hub.

Referring now to FIG. 3, the Figure depicts a cross-sectional view of an embodiment of the hub section (20) in accordance with the present disclosure. The depicted connection section (30) of the hub (20) comprises a weld end (33) adapted to be connected to a pipe, a tank, or a pressure vessel (15), by a weld (34). The connection end (30) comprises a generally flat and/or smooth interior wall (35) defining the bore (21), which can be usable as an access point to an interior portion of the pressure vessel (15), or other components, by maintenance personnel or tools (not shown). In an alternate embodiment (not shown) of the hub (20), instead of a weld end (33), the connection sections (30) may comprise a threaded surface, a flange, or any other end adapted for connection to a corresponding threaded surface, flange, or other end.

FIGS. 1 and 3 further depict an embodiment of the main body (40) having an outer wall (41) and threads (45), which define the inner surface. Although a modified Acme thread (45) form is depicted, standard Acme threads, or any thread form having a generally straight (i.e. parallel) thread configuration, may be used, including trapezoidal, square, V-shaped, or buttress thread forms, or any other thread form that is able to withstand appropriate loads and that allows the plug (60) to make contact (i.e. bottom out) with the internal shoulder (46) (e.g., a seat, a ledge), located at the bottom of the threaded portion (45) of the female hub (20).

Figure 2:
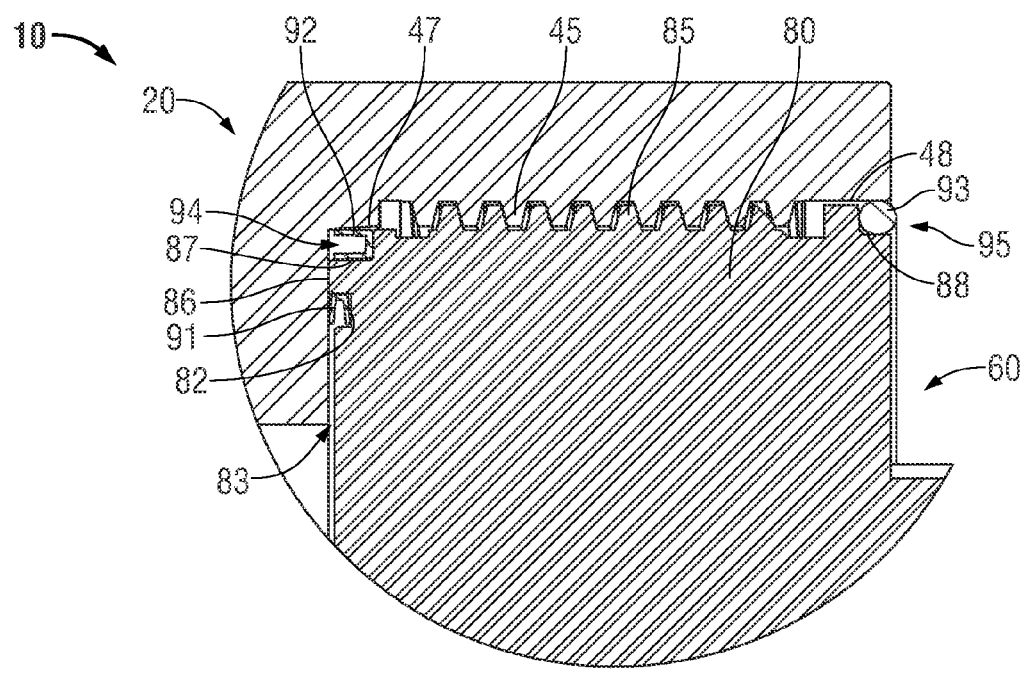
FIG. 2 depicts a cross sectional close-up view of an embodiment of the device usable within the scope of the present disclosure, which includes an embodiment of closure sealing members in the engaged position.

As further depicted in FIG. 3, the inside surface of the main body (40) comprises circumferential sealing surfaces (47, 48) (e.g., internal sealing surfaces), which are located on each side of the internal threads (45). The sealing surfaces (47, 48) can be adapted to form a fluid seal with a corresponding outer seal (92) and O-ring (93) retained on the plug (60), as depicted in FIG. 2. As shown, the upper sealing surface (48) comprises a generally flat and/or smooth interior surface that is located above the internal threads (45), adjacent to the external opening (22) of the hub (20). The upper sealing surface (48) is depicted having a diameter extending approximately to the roots of the internal threads (45). As shown, the lower sealing surface (47) comprises a generally flat and/or smooth interior surface that is located below the internal threads (45) and towards the center of the hub (20). The lower sealing surface (47) is depicted as having an inwardly sloping (e.g. diagonal) configuration, which comprises an outermost diameter extending approximately to the crests of the internal threads (45).

The main body (40) section of the hub (20) also comprises an internal shoulder (46) located between the lower sealing surface (47) and the interior wall (35). As depicted in FIG. 3, the shoulder (46) comprises a generally flat and/or smooth surface oriented in a generally perpendicular direction relative to the longitudinal axis (11) of the hub (20). The shoulder (46) provides a contact surface against which the plug (60) is pressed to form a metal-to-metal seal therebetween, as depicted in FIG. 1. As further depicted in FIG. 3, the hub can also comprise a pressure relief port (42) extending between the central bore (21) and the exterior of the hub (20). As explained below, the pressure relief port may be used to install a PAV valve or any other safety valve.

Figure 4:
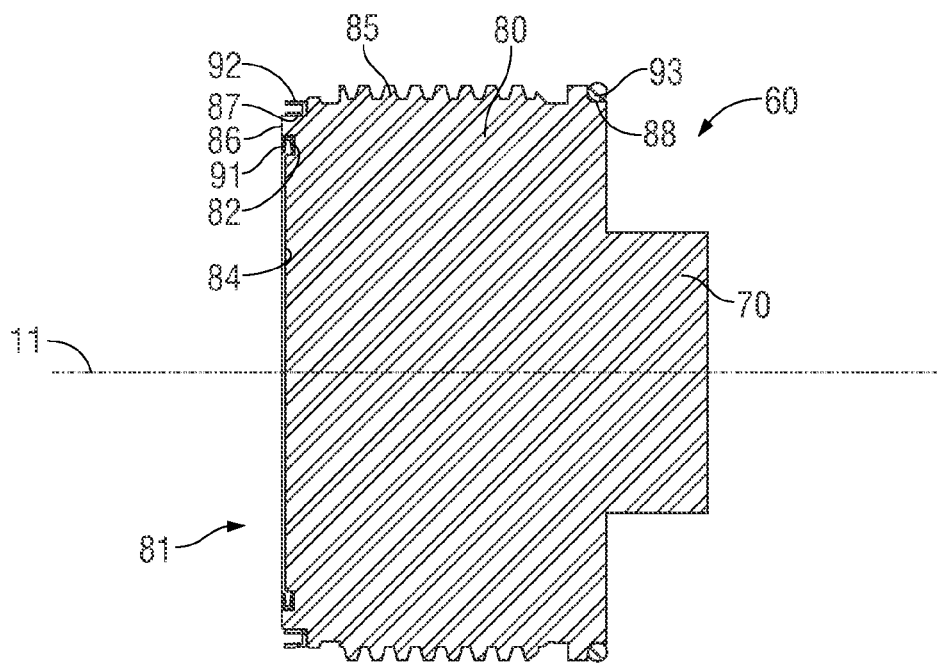
FIG. 4 depicts a cross sectional side view of an embodiment of the device usable within the scope of the present disclosure, which includes an embodiment of the plug.

Referring now to FIG. 4, an embodiment of the plug (60) is shown comprising a head (70) section connected at the back end of the main body (80) section. The head (70) comprises a generally hexagonal configuration, enabling rotation and handling of the plug (60). In alternate embodiments, the head (70) may comprise any shape known in the art for allowing the plug (60) to be manipulated and/or rotated. As show, the main body (80) of the plug (60) comprises a generally cylindrical configuration having a face (81) at the front end thereof and a circumferential outer surface defined by exterior Acme threads (85), which can be adapted to threadably engage the hub (20).

As further depicted in FIG. 4, the outer circumferential surface of the main body (80) comprises sealing surfaces (87, 88), located on each side of the exterior threads (85). Specifically, the upper sealing surface (88) is depicted comprising a generally flat and/or smooth surface located above the external threads (85), and the upper sealing surface (88) comprises a diameter extending approximately to the roots of the external threads (85). As depicted in FIG. 2, while the plug (60) engages the hub (20), an annular gap (95) is formed between the upper sealing surfaces (48, 88), which can be adapted to retain an O-ring (93) therein. The O-ring (93) seals between the upper sealing surfaces (48, 88) and can prevent contaminants (e.g. dust, sand, water, etc.) from entering the space between the internal and external threads (85, 45).

In FIG. 4, the lower sealing surface (87) is depicted having a generally flat and/or smooth interior surface located below the roots of the external threads (85). As shown in FIG. 2, the diameter of the lower sealing surface (87) is depicted having a diameter that extends below the roots of the external threads (85), forming an annular gap (94) between the two sealing surfaces (47, 87) as the hub (20) and the plug (60) engage. The lower sealing surface (87) of the plug (60) is further depicted retaining a outer seal (92), which, during operation, can be positioned within the annular gap (94) and can create a fluid seal between the lower sealing surfaces (47, 87). In the embodiment of the plug (60), as depicted in FIGS. 2 and 4, the outer seal (92) defines the outer portion or the outer edge of the face section (81), wherein the outermost diameter of the outer seal (92) can be smaller than the crest-to-crest diameter (e.g., smallest inside diameter, minor diameter) of the internal threads (45), to prevent the outer seal (92) from interfering with the internal threads (45) of the hub (20), as the plug (60) is engaging the hub (20).

As further depicted in FIGS. 2 and 4, the face (81) of the plug (60) comprises an outer seal (92), a front sealing surface (86), a front seal (91), and a central surface (84). Specifically, located adjacent to the lower sealing surface (87), is a ring-shaped member (e.g. a protrusion) extending from the face (81) and having a ring-shaped front sealing surface (86). Upon full engagement between the plug (60) and the hub (20), the front sealing surface (86) contacts the hub shoulder (46, see FIG. 3), forming a metal-to-metal seal to enhance the integrity of the fluid seal therebetween. It should be understood that while FIG. 4 depicts the front sealing surface (86) being generally perpendicular with respect to the longitudinal axis (11), in alternate embodiments of the plug (60), the front sealing surface (86) may extend at an angle of less than 90 degrees with respect to the longitudinal axis (11), or may comprise an outwardly curving (i.e. convex) shape, resulting in a smaller area of contact with the shoulder (46), which increases contact pressure between the shoulder (46) and the front sealing surface (86).

The plug (60), as shown in FIGS. 2 and 4, is depicted having a face (81) further comprising a front seal (91) positioned within a circular slot (82), wherein the front seal (91) is adapted to seal against the shoulder (46). The depicted front seal (91) is located radially inward from the front sealing surface (86). As further depicted in FIGS. 2 and 4, the central surface (84) is shown as a circular flat surface surrounded by the front seal (91) and recessed along the longitudinal axis (11), relative to the front sealing surface (86), resulting in a gap (83) between the central surface (84) and the shoulder (46). The gap (83) forms a fluid passageway for pressurized gasses or liquids to communicate with the internal surface of the front seal (91), wherein the pressurized gasses of liquids expand the front seal (91) (e.g. expand the lips of the front seal), thereby increasing the sealing action between the shoulder (46) and the circular slot (82) of the face (81).

The abovementioned sealing elements (91, 92, 93) can comprise several configurations and/or material compositions based upon a specific application or an environment. The front seal (91) is depicted in FIG. 4 having a U-shaped configuration with internally facing lips. The front seal (91) can comprise an internal metal support, in the form of a stainless steel cantilever spring (not shown), which can maintain the lips of the seal in engagement with the shoulder (46) and the circular slot (82). In another embodiment (not shown), the front seal (91) can comprise an O-ring, or any other member, which can force the lips of the front seal (91) outwardly. Material composition of the face seal may be a polytetra-fluoro-ethylene (PTFE), any modified form of PTFE, such as TFM, or any other material having properties suitable for the specific application of the closure (10). Although specific embodiments of the front seal (91) are listed above, it should be understood that any seal type adapted to create a fluid seal between the face (81) of the plug (60) and the hub (20) is usable within the scope of the present disclosure.

The outer seal (92), as depicted in FIG. 4, comprises a U-shaped cup configuration that is sufficiently sized to maintain engagement with the lower sealing surface (87) of the plug (60) and to engage the lower sealing surface (47) of the hub (20). The outer seal (92) can comprise a combination of graphite rope, a U-spring made of metal, or any configuration meeting API 6FB specifications for fire testing, or any other fire testing specifications. In another embodiment of the plug (60), the outer seal (92) may comprise PTFE, any modified form of PTFE, such as TFM, or any other material having properties suitable for the specific application of the fluid connector (10). Although specific embodiments of the outer seal (92) are listed above, it should be understood that any seal type adapted to create a fluid seal between the lower sealing surfaces (47, 87) can be usable within the scope of the present disclosure.

The O-ring (93), as depicted in FIG. 4, comprises a standard circular configuration, with a diameter of sufficient size to maintain engagement with the upper sealing surfaces (48, 88). Material composition of the O-ring (93) may be a nitrile butadiene rubber (NBR) or any other material having properties suitable for the specific application of the closure (10). Although specific embodiments of the O-ring (93) are listed above, it should be understood that in other embodiments of the closure (10), the O-ring (93) can be replaced with any seal type, including seal elements described above, which can be adapted to create a seal between the upper sealing surfaces (48, 88).

While the dimensions and/or material composition of the closure (10) can vary depending on the nature of the application, in an exemplary embodiment depicted in FIGS. 1 and 2, the hub (20) can have an outer diameter of 7.00 inches, a bore (21) of 3.25 inches, and an overall length of 5.25 inches. In an exemplary embodiment, the plug (60) can have a main body (80) with an outer diameter of 5.75 inches and a length of 3.125 inches, while the head (70) can have a width of 2.500 inches and a length of 1.00 inch. The closure assembly (10) can comprise a modified Acme thread form having a ¼-inch pitch, wherein the major and the minor diameters of the hub (20) threads are about 5.800 and 5.550 inches, respectively, while the major and the minor diameters of the plug (60) threads are about 5.750 and 5.500 inches, respectively.

Lastly, the closure assembly (10), depicted in FIGS. 1 and 2, can be constructed from any material having adequate strength to withstand repetitive and/or long periods of high internal pressures and having resistance to harsh environmental conditions, such as chemical corrosion and/or extreme weather. Specifically, the closure (10) can be fabricated using various grades of steel, such as American Society for Testing and Materials (ASTM) A524 or A529 carbon steel, or other grades of carbon steel having similar properties and/or such composition necessary to withstand welding temperatures.

Figure 8:
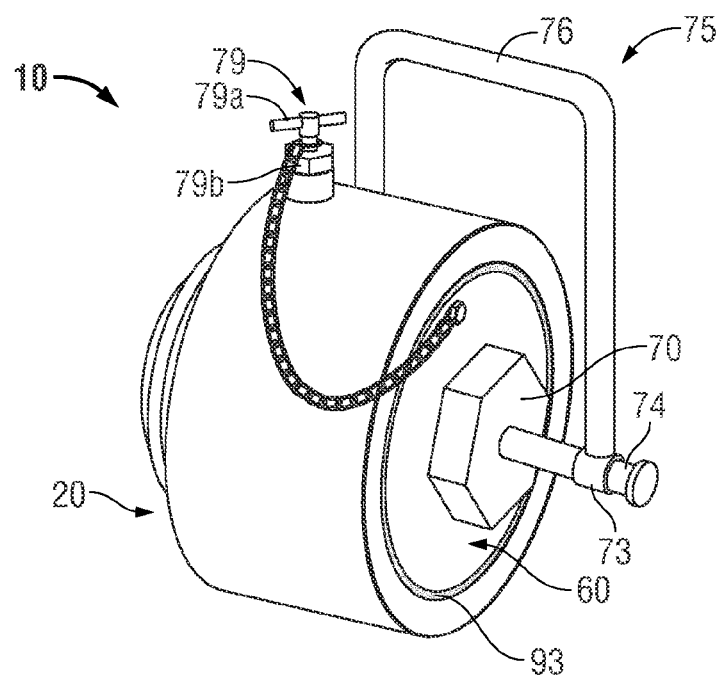
FIG. 8 depicts an isometric view of an embodiment of the device usable within the scope of the present disclosure, which includes an embodiment of the closure assembly in the engaged position.
Figure 9:
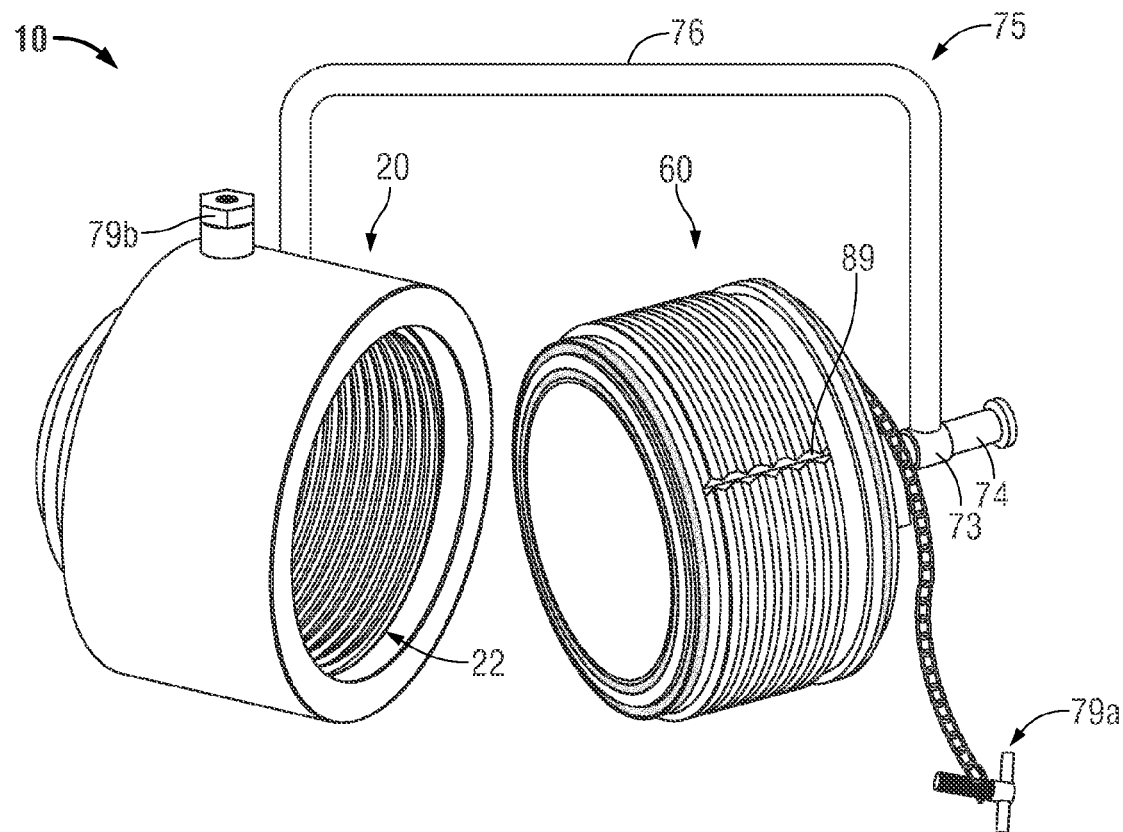
FIG. 9 depicts an isometric view of an embodiment of the device usable within the scope of the present disclosure, which includes an embodiment of the closure assembly in the disengaged position.

In other embodiments of the closure assembly (10), especially large bore closure assemblies, a support or a hinge mechanism may be provided for securing the plug (60) to the hub (20). As the size of the plug (60) increases, so does its weight, requiring the assistance of a support mechanism, such as a davit (75), as depicted in FIGS. 8 and 9, which selectively moves the plug (60) into or out of the hub (20). The embodiment of the closure assembly (10), shown in FIG. 8, depicts a davit (75), comprising a pivoting support arm (76), which can connect the plug (60) to the hub (20). Specifically, as depicted in FIG. 8, the support arm (76) is connected to a side arm (not shown), extending laterally from the hub (20), by way of a vertical pivot joint (not shown). The opposite end of the support arm (76) comprises a horizontal pivot joint (73) connected to a pivot pin (74), which is connected to the head (70) section along the central axis (11, see FIG. 1) of the plug (60). During plug (60) engagement and disengagement procedures, the horizontal pivot joint (73) allows the plug (60) to rotate about its central axis (11), while the threads (45, 85) are being engaged or disengaged. The horizontal joint (73) can allow the plug (60) to move linearly along its central axis (11), relative to the hub (20), while the threads (45, 85) are being engaged or disengaged. When the threads are disengaged, the vertical pivot (not shown) allows the support arm (76) to swing out, along with the plug (60), attached thereto, allowing access through the external opening (22) of the hub (20), to the internal portion of the pressure vessel (15) or any other container or conduit to which the hub (20) is attached, as depicted in FIG. 9. It should be understood that while FIGS. 8 and 9 depict a single embodiment of the davit (75), any support or hinge mechanism known in the art can be usable and is within the scope of the present disclosure.

Furthermore, the closure assembly (10) can incorporate safety features or devices, which decrease the chances of personal injury during closure opening procedures. Referring again to FIG. 8, the Figure depicts a pressure alert valve (PAV) (79), which can be threadably engaged with a port (42) in the main body (40) of the hub (20). As depicted in FIG. 3, the port extends between the surface of the main body (40) and the bore (21), providing a passageway for compressed gasses within the pressure vessel (15) to evacuate prior to opening of the closure (10). As depicted in FIG. 8, before the plug (60) can be rotated, the seating screw (79a) must be removed from the PAV body (79b). This action will relieve any residual pressure in the pressure vessel (15) before the plug is rotated. As PAVs are known in the industry, it should be understood that any PAV or a similar device can be used with the closure (10) and is within the scope of the present disclosure.

Another safety feature that can be incorporated in an embodiment of the closure (10) is a pressure vent groove (89). Referring again to FIG. 9, a pressure vent groove (89) can be cut into the threads (85) of the plug (60), thereby creating a passageway to relieve any residual pressure within the pressure vessel (15). Specifically, as the plug (60) is rotated, the fluid seals (86, 91, 92) are disengaged, allowing gasses to escape through the vent groove (89), prior to full disengagement of the threads (45, 85). In another embodiment (not shown) of the closure (10), a vent groove can be cut into the internal threads (45) of the hub (60). As vent grooves are known in the industry, it should be understood that any vent groove or a similar feature can be used with the closure (10) and is within the scope of the present disclosure.

Figure 10:
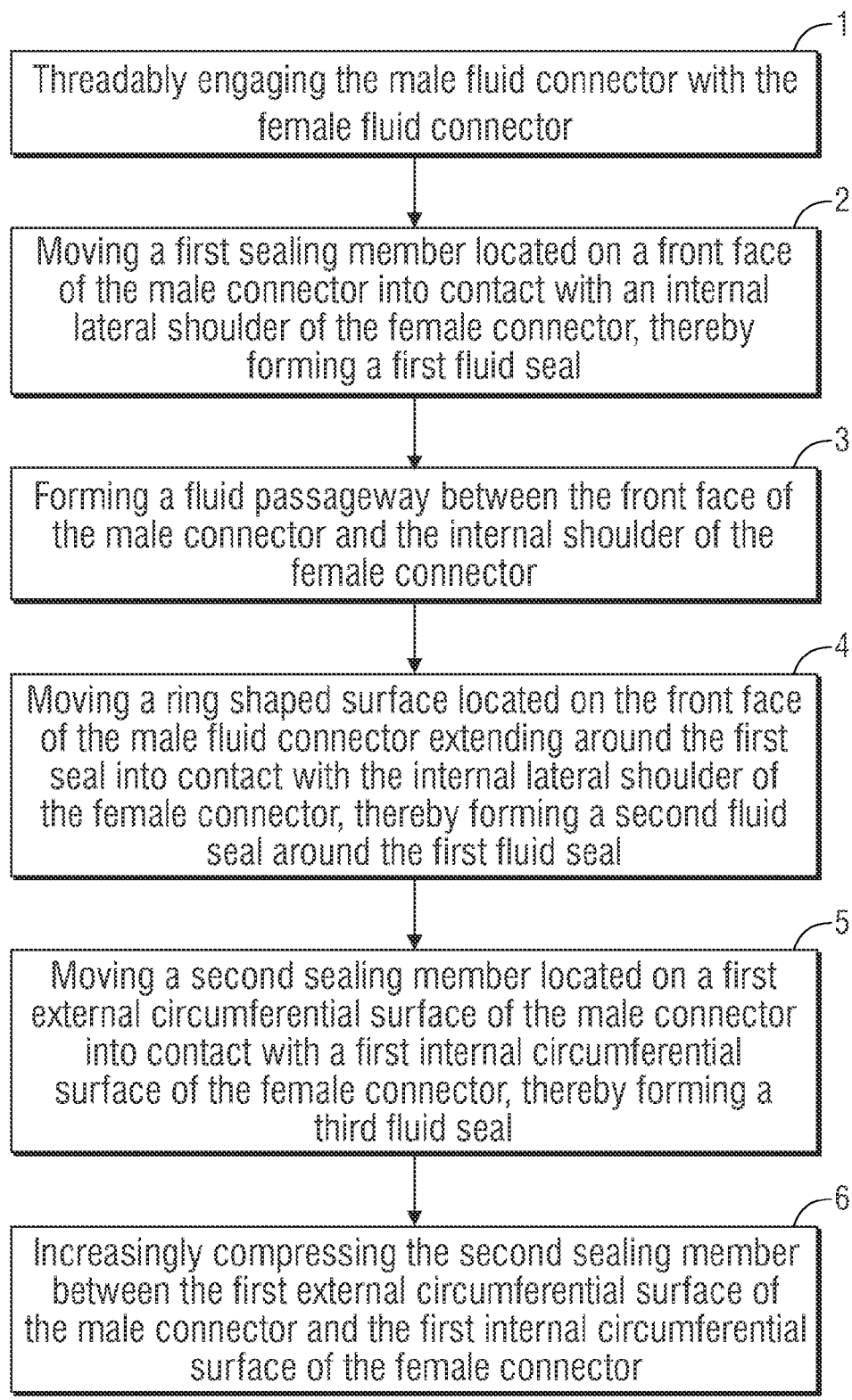
FIG. 10 depicts a diagram illustrating an embodiment of a method usable within the scope of the present disclosure.

Embodiments usable within the scope of the present disclosure also relate to methods of using the closure assembly (10). FIG. 10 depicts an embodiment of the method of the present invention includes making a sealed connection between a female fluid connector (i.e., the hub (20)) and a male fluid connector (i.e., the plug (60)). Prior to full engagement between the hub (20) and the plug (60), the plug (60) is positioned in linear alignment, along central axis (11), with the hub (20). With or without assistance of a davit (75), depicted in FIGS. 8 and 9, the face (81) of the plug (60), as depicted in FIG. 4, can be inserted into the hub opening (22), depicted in FIG. 3, until the external threads (85) of the plug (60) can contact the internal threads (45) of the hub (20). At this point, as recited in Step 1 of FIG. 10, the plug (60) can be rotated in relation to the hub (20) until the threads (45, 85) engage. As the plug (60) approaches full engagement with the hub, the lips of the outer seal (92) can make contact with the lower sealing surface (47), creating a fluid seal therebetween, as recited in Step 5 of FIG. 10. Furthermore, the outer seal (92) can be increasingly compressed between lower sealing surface (87) of the plug (60) and the sloped lower sealing surface (47) of the hub (20), as recited in Step 6 of FIG. 10.

Simultaneously, as the face (81) approaches the shoulder (46), the front seal (91) can be increasingly compressed between the shoulder (46) and the circular slot (82), creating a fluid seal therebetween, as recited in Step 2 of FIG. 10. Rotating the plug (60) further can cause the front sealing surface (86) to make contact with the shoulder (46), thereby creating a metal-to-metal seal therebetween, as depicted in FIGS. 1 and 2 and recited in Step 4 of FIG. 10. Depicted in FIG. 2 and recited in Step 3 of FIG. 10, a gap (83) between the central surface (84) of the plug (60) and the internal shoulder (46) of the hub (20), for communicating fluid from an axial bore (21) into the space between lips of the front seal (91), is formed. As the front sealing surface (86) makes contact with the shoulder (46), the axial bore (21) is blocked by the plug (60) to prevent fluids within the pressure vessel (15) from escaping through the opening (22) when pressurized.

As depicted in FIGS. 1 and 2, the front seal (91), the metal-to-metal seal, and the outer seal (92) can prevent or reduce the fluid from escaping between the hub (20) and the plug (60) when pressurized. Furthermore, the plug (60) may be tightened, locking its position within the hub (20) and creating additional force of contact between the front sealing surface (86) and the shoulder (46), thereby improving the sealing capabilities of the metal-to-metal seal. Lastly, when the internal pressure within the vessel (15) is increased, pressurized fluids therein expand the front seal (91), thereby increasing the force of contact between the front seal (91) and the shoulder (46) on one side of the front seal (91) and the front seal (91) and the circular slot (82) on the other side, thereby increasing the sealing capabilities of the front seal (91).

Figure 5:
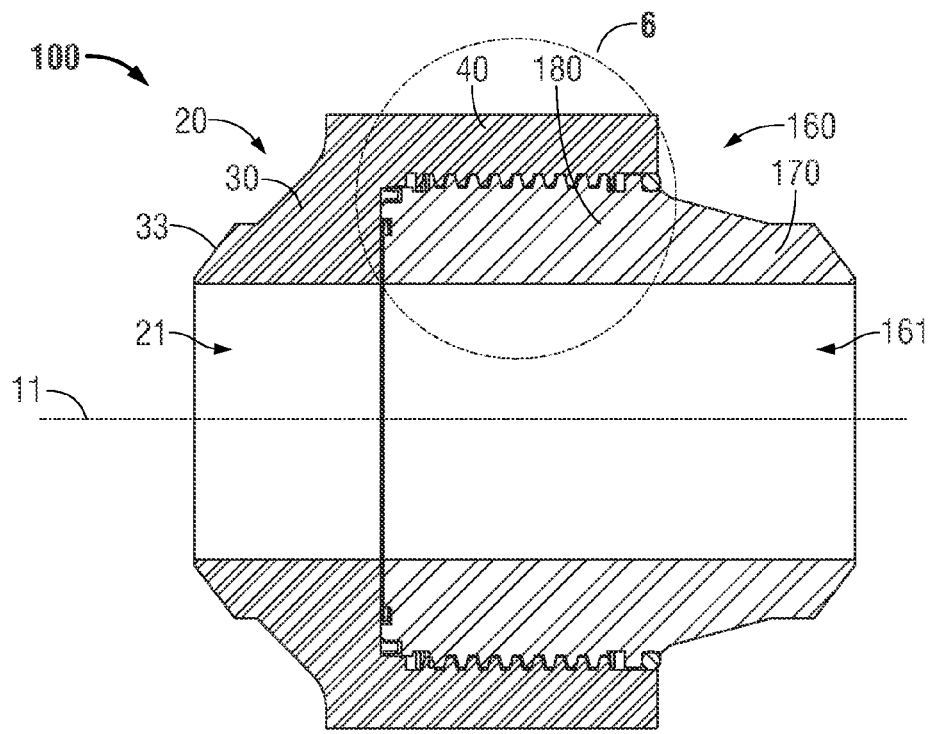
FIG. 5 depicts a cross sectional side view of an embodiment of a device usable within the scope of the present disclosure, which includes an embodiment of a fluid connector assembly in an engaged position.
Figure 6:
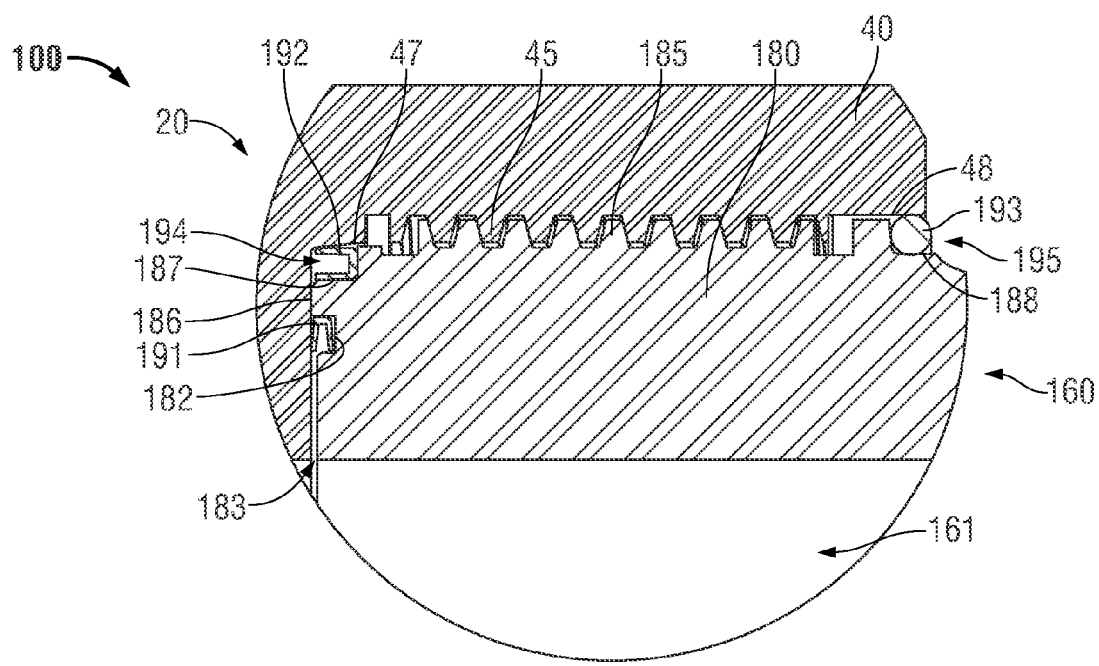
FIG. 6 depicts a cross sectional close-up view of an embodiment of the device usable within the scope of the present disclosure, which includes an embodiment of the fluid connector sealing members in the engaged position.

Embodiments usable within the scope of the present disclosure also relate to a fluid connector usable to transfer pressurized fluids therethrough. Referring now to FIGS. 5 and 6, the Figures show a side cross-sectional view of an embodiment of the fluid connector assembly (100), comprising a hub (20) and a male connector (160), in an engaged position. The embodiment of the hub (20), depicted in FIGS. 5 and 6, comprises essentially the same configuration as depicted in FIGS. 1, 2, and 3; however, FIGS. 5 and 6 depict the hub (20) in engagement with a male connector (160). Specifically, the hub (20), depicted in FIGS. 5 and 6, has a generally cylindrical configuration comprising a bore (21) extending therethrough, along a central axis (11) of the hub (20). The hub (20) further comprises a connection section (30), which can be adapted for connection to a pressure vessel, a pipe, or any other fluid conduit or container, and a main body (40), which can be adapted to threadably engage and form a fluid seal with the male connector (160). The depicted male connector (160) has a generally cylindrical configuration comprising a bore (161) extending therethrough along a central axis (11) thereof. The male connector (160) further comprises a connection section (170), which can be adapted for connection to a vessel, a container, a pipe, or a fluid conduit, and a main body section (180), which can be adapted to threadably engage and form a fluid seal with the hub (20).

Referring again to FIG. 3, depicting an embodiment of the hub section (20) in accordance with the present disclosure. The depicted connection section (30) of the hub (20) comprises a weld end (33), that can be adapted to be connected to a fluid conduit or a pressure vessel (15), by a weld (34). The connection end (30) comprises a generally flat and/or smooth interior wall (35) defining the bore (21) that can be usable as an access point to an interior portion of the pressure vessel (15), or other components, by maintenance personnel or tools (not shown). In an alternate embodiment (not shown), the connection sections (30) may comprise a threaded surface, a flange, or any other end that can be adapted for connection to a corresponding threaded surface, flange, or other end.

FIGS. 3 and 6 further depict an embodiment of the hub (20), which comprises a main body (40) having an outer wall (41) and connection threads (45), defining the inner surface. Although modified Acme threads (45) are depicted, standard Acme threads, or any other thread form having a generally straight (i.e. parallel) thread configuration, may be used, including trapezoidal, square, V-shaped, or buttress thread forms. Furthermore, any other thread form can be used if it is able to withstand appropriate loads and can allow the male connector (160) to make contact (i.e. bottom out) against the internal shoulder (46), located at the bottom of the threaded portion (45) of the female hub (20). The depicted inner surface of the main body (40) further comprises circumferential sealing surfaces (47, 48) located on each side of the internal threads (45), wherein the sealing surfaces (47, 48) can be adapted to form a fluid seal with a corresponding outer seal (192) and O-ring (193) retained on the male connector (160). The main body (40) section of the hub (20) can comprise an internal shoulder (46) located between the lower sealing surface (47) and the interior wall (35). As depicted, the shoulder (46) comprises a generally flat and/or smooth surface oriented in a generally perpendicular direction relative to the longitudinal axis (11) of the hub (20). The shoulder (46) provides a contact surface against which the male connector (160) can be pressed to form a metal-to-metal seal therebetween.

Figure 7:
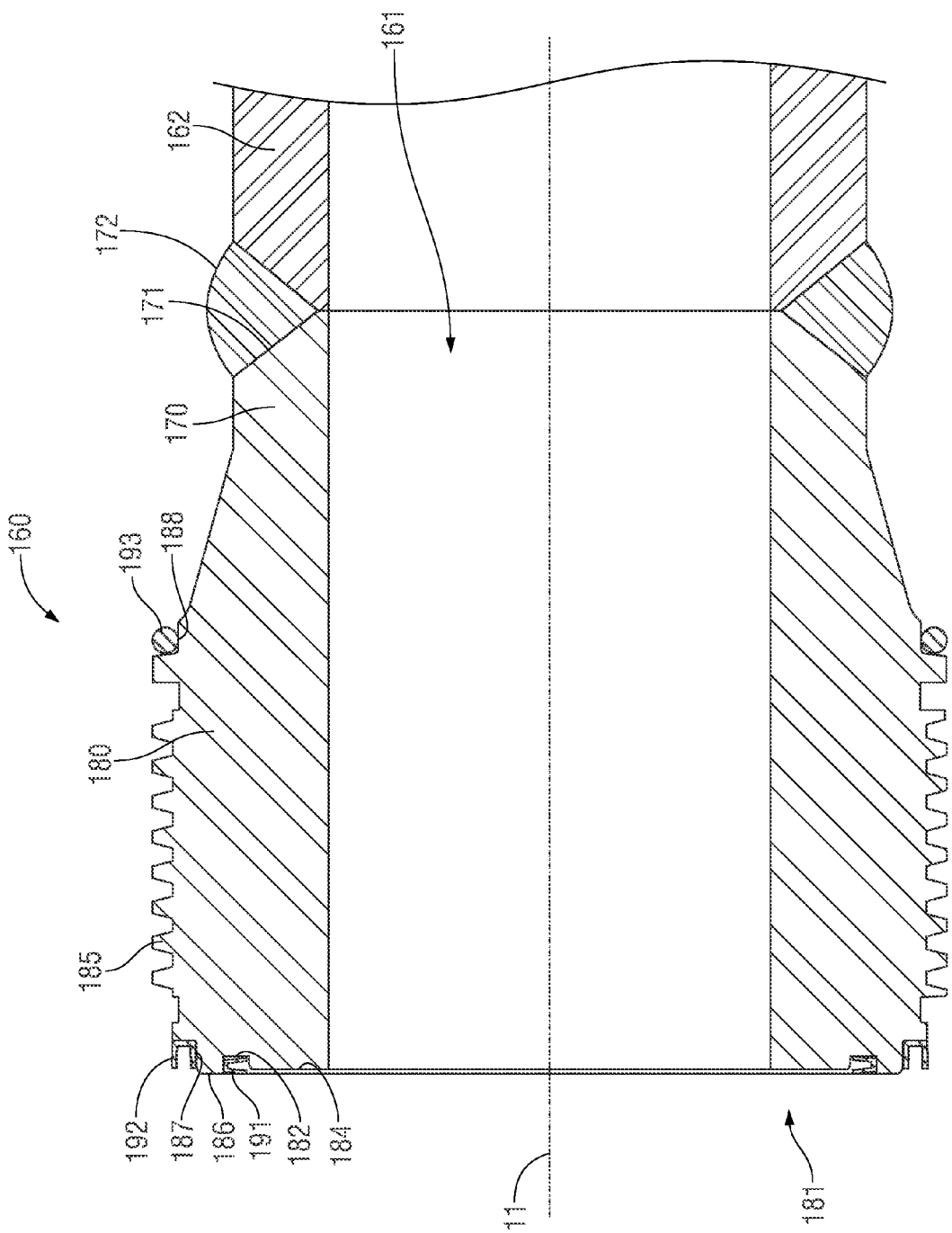
FIG. 7 depicts a cross sectional side view of an embodiment of the device usable within the scope of the present disclosure, which includes an embodiment of the male fluid connector.

Referring now to FIGS. 5 and 7, a cross-sectional view of an embodiment of the male connector (160) is shown comprising a connection section (170) which can be connected to a main body (180) section. The depicted male connector (160) comprises a bore (161) extending through the main body (180) and the connection section (170) of the male connector (160), along the central axis (11) thereof. Both the hub bore (21) and the male connector bore (161) comprise essentially the same diameters and are co-axially aligned when the hub (20) and the male connector (160) are engaged, as depicted in FIG. 5.

The connection section (170), depicted in FIG. 7, comprises a weld end (171) connected to a pipe (162) by a weld (172). Although FIG. 7 depicts the male connector (160) connected to a pipe (162), in other embodiments, the male connector (160) can be connected to pressure vessels, or other fluid conduits or containers. The depicted main body (180) of the male connector (160) can comprise a generally cylindrical configuration having a face (181) and a circumferential surface having exterior threads (185) that can be adapted to threadably engage the hub (20). In an alternate embodiment (not shown) of the male connector (160), instead of a weld end (171), the connection sections (170) may comprise a threaded surface, a flange, or any other end adapted for connection to a corresponding threaded surface, flange, or other end.

As further depicted in FIG. 7, the circumferential surface of the main body (180) can comprise sealing surfaces (187, 188) located on each side of the exterior threads (185). Specifically, the upper sealing surface (188) is depicted comprising a generally flat and/or smooth surface located above the external threads (185) and having a diameter extending approximately to the roots of the external threads (185). While the male connector (160) engages the hub (20), as depicted in FIG. 6, an annular gap (195, see FIG. 6) is formed between the upper sealing surfaces (48, 188) adapted to retain an O-ring (193) therein, wherein the O-ring (93) seals between the upper sealing surfaces (48, 188) to prevent contaminants (e.g. dust, sand, water, etc.) from entering the space between the internal and external threads (45, 185). The lower sealing surface (187) is depicted in FIG. 7, having a generally flat and/or smooth interior surface located below the roots of the external threads (185). The diameter of the lower sealing surface (187) is depicted having a diameter that extends below the roots of the external threads (185), forming an annular gap (194, see FIG. 6) between the two sealing surfaces (47, 187) as the hub (20) and the male connector (160) engage. The lower sealing surface (187) of the male connector (160) is further depicted retaining a outer seal (192), which, during operation, is positioned within the annular gap (194) and creates a fluid seal between the lower sealing surfaces (47, 187). In the embodiment of the male connector (160), as depicted in FIGS. 6 and 7, the outer seal (192) defines the outer portion or the outer edge of the face section (181), wherein the outermost diameter of the outer seal (192) can be smaller than the crest-to-crest diameter (e.g., smallest inside diameter, minor diameter) of the internal threads (45) of the hub (20), to prevent the outer seal (192) from interfering with the internal threads (45) of the hub (20) as the male connector (160) is engaging the hub (20).

As further depicted in FIG. 7, depicting an embodiment of the male connector (160), the face (181) of the male connector (160) comprises an outer seal (192), a front sealing surface (186), a front seal (191), and central surface (184). Specifically, located adjacent to the lower sealing surface (187), is a ring-shaped member (e.g. a protrusion) extending from the face (181) and having a ring-shaped front sealing surface (186). Upon full engagement between the male connector (160) and the hub (20), the front sealing surface (186) contacts the hub shoulder (46), forming a metal-to-metal seal to enhance the integrity of the fluid seal therebetween. It should be understood that while FIG. 7 depicts the front sealing surface (186) being generally perpendicular with respect to the longitudinal axis (11), in alternate embodiments of the male connector (160), the front sealing surface (186) may extend at an angle of less than 90 degrees with respect to the longitudinal axis (11), or may comprise an outwardly curving (e.g. convex) shape, resulting in a smaller area of contact with the shoulder (46), which increases force of contact pressure between the shoulder (46) and the front sealing surface (186).

The male connector (160) shown in FIG. 7 is depicted having a face (181) further comprising a front seal (191) positioned within a circular slot (182), wherein the front seal (191) is adapted to seal against the shoulder (46). The depicted front seal (191) is located radially inward from the front sealing surface (186). As further depicted in FIGS. 6 and 7, the central surface (184) is shown as a circular flat surface surrounded by the front seal (191) and recessed along the longitudinal axis (11) relative to the front sealing surface (186), resulting in a gap between the central surface (184) and the shoulder (46). The gap forms a fluid passageway for pressurized gasses or liquids to communicate with the internal surface of the front seal (191) and expand it (e.g. expand the lips of the front seal), thereby increasing the sealing action between the shoulder (46) and the circular slot (182) of the face (181).

The abovementioned sealing elements (191, 192, 193) can comprise several configurations and/or material compositions based on a specific application or an environment. The sealing elements (191, 192, 193), can be usable as part of the male connector (160), as depicted in FIGS. 6 and 7 and described above, and can comprise essentially the same configuration as the sealing elements (91, 92, 93), respectively, usable as part of the plug (60) depicted in FIGS. 2 and 4 and described above.

Specifically, the front seal (191), as depicted in FIG. 7, comprises a U-shaped configuration with internally facing lips. The seal can comprise an internal metal support in the form of a stainless steel cantilever spring, which maintains the lips of the seal in engagement with the shoulder (46) and the circular slot (182). In another embodiment, the front seal (191) can comprise an O-ring, or any other member, which forces the lips of the front seal (191) outwardly. Material composition of the face seal can be PTFE, any modified form of PTFE, such as TFM, or any other material having properties suitable for the specific application of the fluid connector (100). Although specific embodiments of the front seal (191) are listed above, it should be understood that any seal type adapted to create a fluid seal between the face (181) of the male connector (160) and the hub (20) can be usable within the scope of the present disclosure.

The outer seal (192), as depicted in FIG. 7, comprises a U-shaped cup configuration sufficiently sized to maintain engagement with the lower sealing surface (187) of the male connector (160) and to engage the lower sealing surface (47) of the hub (20). The outer seal (192) may comprise a metal U-spring or a graphite rope, and can be configured to meet API 6FB specifications for fire testing or any other fire testing specifications. In another embodiment of the male connector (160), the outer seal (192) may comprise PTFE, any modified form of PTFE, such as TFM, or any other material having properties suitable for the specific application of the fluid connector (100). Although specific embodiments of the outer seal (192) are listed above, it should be understood that any seal type adapted to create a fluid seal between the lower sealing surfaces (47, 187) can be usable within the scope of the present disclosure.

The O-ring (193), as depicted in FIG. 7, comprises a standard circular configuration, with a diameter of sufficient size to maintain engagement with the upper sealing surfaces (48, 188). Material composition of the O-ring (193) may be a nitrile butadiene rubber (NBR) or any other material having properties suitable for the specific application of the fluid connector (100). Although specific embodiments of the O-ring (193) are listed above, it should be understood that in other embodiments of the fluid connector assembly (100), the O-ring (193) can be replaced with any seal type, including seal elements described above, adapted to create a seal between the upper sealing surfaces (48, 188).

Furthermore, the connector assembly (100) can also incorporate safety features or devices described above, which decrease the chances of personal injury during connector (100) disengagement procedures.

While the dimensions and/or material composition of the connector assembly (100) can vary depending on the nature of the application, in an exemplary embodiment depicted in FIGS. 5 and 6, the hub (20) can have an outer diameter of 7.00 inches, a bore (21) of 3.25 inches, and an overall length of 5.25 inches. In an exemplary embodiment, the male connector (160) can have a main body (180) with an outer diameter of 5.75 inches and a length of 3.125 inches, while the connection section (170) can have a minimum width of 4.500 inches and a length of 2.250 inch. The bore (161) extending through the male connector can comprise a diameter of 3.250 inches. The connector assembly (100) can also comprise a modified Acme thread form having a ¼-inch pitch, wherein the major and the minor diameters of the hub (20) threads are about 5.800 and 5.550 inches, respectively, while the major and the minor diameters of the male connector (160) threads are about 5.750 and 5.500 inches, respectively.

Lastly, the connector assembly (100) depicted in FIGS. 5 and 6 can be constructed from any material having adequate strength to withstand repetitive and/or long periods of high internal pressures and having resistance to harsh environmental conditions, such as chemical corrosion and/or extreme weather. Specifically, the closure (10) can be fabricated using various grades of steel, such as ASTM A524 or A529 carbon steel, or other grades of carbon steel having similar properties and/or such composition necessary to withstand welding temperatures.

Embodiments usable within the scope of the present disclosure also relate to methods of using the connector assembly (100). FIG. 10 depicts an embodiment of the method of the present invention, which includes making a sealed connection between a female fluid connector (i.e. the hub (20)) and a male fluid connector (160). Prior to full engagement between the hub (20) and the male connector (160), the male connector (160) is positioned in linear alignment, along central axis (11), with the hub (20). With or without assistance of a support mechanism (not shown), the face (181) of the male connector (160), depicted in FIG. 7, can be inserted into the hub opening (22), depicted in FIG. 3, until the external threads (185) of the male connector (160) make contact with the internal threads (45) of the hub (20). At this point, as recited in Step 1 of FIG. 10, the male connector (160) can be rotated in relation to the hub (20) until the threads (45, 185) engage. As the male connector (160) approaches full engagement with the hub, the lips of the outer seal (192) can make contact with the lower sealing surface (47) of the hub (20), creating a fluid seal therebetween, as recited in Step 5 of FIG. 10. Furthermore, the outer seal (192) can be increasingly compressed between lower sealing surface (187) of the male connector (160) and the sloped lower sealing surface (47) of the hub (20), as recited in Step 6 of FIG. 10.

Simultaneously, as the face (181) approaches the shoulder (46), the front seal (191) can be increasingly compressed between the shoulder (46) and the circular slot (182), creating a fluid seal therebetween, as recited in Step 2 of FIG. 10. Rotating the male connector (160) further causes the front sealing surface (186) to make contact with the shoulder (46), thereby creating a metal-to-metal seal therebetween, as depicted in FIGS. 5 and 6 and recited in Step 4 of FIG. 10. Depicted in FIG. 6 and recited in Step 3 of FIG. 10, a gap (183) between the central surface (184) of the male connector (160) and the internal shoulder (46) of the hub (20), for communicating fluid from an axial bore (21) into the space between lips of the front seal (191), can be formed. As the front sealing surface (186) makes contact with the shoulder (46), the axial bore (21) of the hub (20) can be axially aligned with the axial bore (161) of the male connector (160) to create a pathway for fluids between the hub (20) and the male connector (160).

As depicted in FIGS. 5 and 6, the front seal (191), the metal-to-metal seal formed between the shoulder (46) and the front sealing surface (186), and the outer seal (192), can prevent or reduce fluid from escaping between the hub (20) and the male connector (160). Furthermore, the male connector (160) may be tightened, locking its position within the hub (20) and creating additional force of contact between the front sealing surface (186) and the shoulder (46), thereby improving the sealing capabilities of the metal-to-metal seal. Lastly, when the internal pressure within the bores (21, 161) of the connector assembly (100) is increased, pressurized fluids therein can expand the front seal (191), thereby increasing the force of contact between the front seal (191) and the shoulder (46) on one side and the front seal (191) and the circular slot (182) on the other side, thereby increasing the sealing capabilities of the front seal (191).

Embodiments usable within the scope of the present disclosure also relate to a fluid connector usable with fluid valves (not shown). Although the embodiments of the connector assembly, described above and shown in FIGS. 1-3 and 5-9, disclose the housing (e.g., the female connector) as a hub (20), it should be understood that in other embodiments of the connector assembly, the housing may be integrated into a fluid valve or a fluid valve housing. Specifically, other embodiments of the connector assembly may include elements of the housing, such as the bore (21), the smooth interior wall (35), the internal shoulder (46), the circumferential sealing surfaces (47, 48), and the threaded portion (45), as described above and depicted in FIGS. 1-3 and 5-9, used within a fluid valve or fluid valve housing. For example, elements of the housing may be used with fluid valves such as a blow down valve, a ball valve, a gate valve, a butterfly valve, a flow control valve, or any other valve known in the industry. The plug (60) and the male connector (160), as described above and depicted in FIGS. 1-9, can be used with the fluid valve to block fluid flow or to establish a fluid connection.

While various embodiments of the present invention have been described with emphasis, it should be understood that within the scope of the appended claims, the present invention might be practiced other than as specifically described herein.

What is claimed is:

1. A connector assembly comprising:
a housing having a bore extending therethrough along a longitudinal axis thereof, wherein the housing comprises a main body, a first end and a second end, wherein the main body comprises an outer wall and internal threads that define an inner surface, wherein the second end comprises internal threads, wherein the housing further comprises an internal shoulder, extending laterally relative to the longitudinal axis, extending between a lower circumferential sealing surface and the interior wall, wherein the lower circumferential sealing surface and an upper circumferential sealing surface are located on each side of the internal threads, wherein the upper sealing surface has a diameter extending approximately to roots of the internal threads, wherein the lower sealing surface comprises a substantially flat, smooth interior surface that is located below the internal threads and towards a center of the housing; and
a plug comprising external threads, a face section, and sealing surfaces located on the outer circumference of the plug that form annular gaps, wherein the external threads are adapted to engage the internal threads of the housing and form annular gaps when engaged, wherein the face section is adapted to be inserted into the housing and to form a fluid seal with the housing to prevent fluids from flowing through the bore, wherein the face section comprises:
  a first seal adapted to engage the internal shoulder in forming the fluid seal; and
  a front sealing surface extending around the fluid seal, wherein the front sealing surface is adapted to contact the internal shoulder to form a metal-to-metal fluid seal.

2. The apparatus of claim 1, wherein the first end is adapted to connect to a container or be integrally formed with the container, wherein the container comprises a pressure vessel, a fluid vessel, a fluid holder, a fluid valve, a fluid conduit, a pipe, or combinations thereof.

3. The apparatus of claim 1, wherein the first seal comprises a U-cup seal, wherein a central portion of the face section that is surrounded by the first seal is adapted to allow fluids within the container to contact the first seal.

4. The apparatus of claim 1, wherein a central portion of the face section is recessed with respect to the front sealing surface.

5. The apparatus of claim 1, wherein the face section further comprises a second seal extending around the front sealing surface, wherein the second seal defines the outer edge of the face section, and wherein the second seal is adapted to engage the first internal sealing surface to form a second fluid seal.

6. The apparatus of claim 1, wherein a first internal sealing surface extends diagonally with respect to the longitudinal axis.

7. The apparatus of claim 1, wherein the housing further comprises a second internal sealing surface above the internal threads, wherein the plug further comprises a third seal extending around the plug and above the external threads, and wherein the third seal is adapted to engage the second internal sealing surface to form a third fluid seal.

8. The apparatus of claim 1, wherein the internal threads and the external threads comprise a parallel thread form.

9. The apparatus of claim 1, wherein the plug further comprises a bore extending therethrough along a longitudinal axis thereof, wherein the plug further comprises a connection end opposite the face section, and wherein the connection end is adapted to connect to a container, a pipe, a fluid conduit, or combinations thereof.

10. The apparatus of claim 1, wherein the lower circumferential sealing surface and an upper circumferential sealing surface are adapted to from a fluid seal with an outer seal and o-ring retained on the plug.

* * * * *